United States Patent

Golshani et al.

[11] Patent Number: 5,850,631
[45] Date of Patent: Dec. 15, 1998

[54] METHOD FOR PROVIDING A GRAPHICAL INTERFACE FOR THE SPECIFICATION OF RELATIONSHIPS BETWEEN TWO SCHEMAS

[75] Inventors: Forouzan Golshani, Paradise Valley; Oris D. Friesen; Thomas H. Howell, both of Scottsdale, all of Ariz.

[73] Assignee: Bull HN Information Systems Inc., Billerica, Mass.

[21] Appl. No.: 624,724

[22] Filed: Mar. 26, 1996

[51] Int. Cl.⁶ .................................................. G06F 15/173
[52] U.S. Cl. ........................... 707/102; 707/103; 345/333; 345/341; 345/355
[58] Field of Search ..................................... 395/612, 613, 395/968, 339, 340, 341, 352; 707/102, 103; 345/333, 341, 355

[56] References Cited

U.S. PATENT DOCUMENTS

| | | | |
|---|---|---|---|
| 4,714,995 | 12/1987 | Materna et al. | 364/200 |
| 5,212,787 | 5/1993 | Baker et al. | 395/600 |
| 5,295,222 | 3/1994 | Wadhwa et al. | 395/1 |
| 5,295,256 | 3/1994 | Bapat | 395/500 |
| 5,499,371 | 3/1996 | Henniger et al. | 395/700 |
| 5,542,078 | 7/1996 | Martel et al. | 395/600 |
| 5,551,030 | 8/1996 | Linden et al. | 395/600 |
| 5,627,979 | 5/1997 | Chang et al. | 395/335 |

*Primary Examiner*—Thomas G. Black
*Assistant Examiner*—Jean R. Homere
*Attorney, Agent, or Firm*—J S Solakian; E W Hughes

[57] ABSTRACT

A method executed by a computer system for providing a visual interface Nor specifying relationships and correspondences between two graphically displayed database schemas in object oriented form. After displaying two schemas, selecting an object one from each and displaying their attributes. After selecting a pair of attributes if they are key attributes, comparing their domains and recording same and checking to determine if there is a mis-match as to data types. If either attribute is not a key attribute, checking to see if there is a mis- match of data types. If in either case there is no mismatch, then select a name for the combined attribute and deleting the attributes so combined from the list of attributes for each object. Repeating until all attributes of all objects of the two schemas have been combined, then generating a file containing all correspondences and a list of all assertions of correspondences.

3 Claims, 6 Drawing Sheets

METHOD FOR PROVIDING A GRAPHICAL INTERFACE FOR THE SPECIFICATION OF RELATIONSHIPS BETWEEN TWO SCHEMAS

CROSS-REFERENCE TO RELATED APPLICATIONS

U.S. Patent Application of Forouzan Golshani, et al entitled Method of Integrating Schemas of Distributed Heterogeneous Databases, Ser. No. 08/624,726; and U.S. Patent Application of Forouzan Golshani et al entitled Method of Graphically Displaying an Object Oriented Schema, Ser. No. 08/624,725; which applications were filed concurrently on Mar. 26, 1996, and which are assigned to the assignee of the present invention.

BACKGROUND OF THE INVENTION

(1) Field of the Invention

This invention relates to distributed database management systems and more particularly to a visual interface tool for the specification of relationships and correspondences between the components of two schemas in the process of schema integration. This visually-oriented method allows users to interactively assert the correspondences existing between the object classes of the two schemas and between the attributes of the object classes for the purpose of integration.

(2) Background of the Invention

Many enterprises have accumulated throughout the years, either by expansion or by acquisition, a number of database management systems (DBMS)s. These systems are generally heterogeneous in that they differ from one another with respect to platform, or computer system in which they reside, data model, language for implementation, languages for querying and updating schema and data types. With the trend toward interoperability in enterprises, it has become more and more necessary for the existing database management systems to cooperate and to exchange data. Without a software tool, or method, for schema integration, a user must either manually retrieve the local schemas of other database systems of interest or guess what may be available on other desired database systems which reside at a remote site. Without a global (integrated) schema, any query involving retrieval from more than one database system must be broken down manually, and partial answers received from the participating database systems must be merged by the user. For a description of a method for schema integration, reference is made to the above identified cross-referenced patent application which is hereby incorporated herein by reference and made a part hereof.

Schema Integration is the process of integrating a plurality of existing schemas into a single logical schema. The object is to provide a new and coherent view of the components of multiple database management systems. Usually these database systems are heterogeneous and originally were not designed to be interoperable.

Although schema integration may be done via non-graphical methods, i.e., the traditional way that requires the user to write specific code, a visual interface provides the user with a graphical presentation of the schemas and enables the user to "point" and "click" at the appropriate objects in order to specify the desired operations.

While graphical display of schemas is particularly useful in the process of integrating schemas of heterogeneous databases, this method has utility in such other areas as: query formulation, by which the user can specify the desired query by clicking on the appropriate objects; schema modification, where the user makes changes to the schema through the visual interface; and schema browsing for the purpose of examining the logical contents of the database.

SUMMARY OF THE INVENTION

The present invention is a method, or software tool, practiced by a computer system which when two schemas are presented graphically on the display device such as a CRT of the computer system in which this method and associated software tools resides to provide an interactive environment in which database integrators can specify the inherent correspondences between the object classes of the two schemas and between the attributes of the object classes. The tool assists the user in the process by presenting the appropriate choices in menus that appear just in time for each operation. All the user has to do is "point" at the desired object or appropriate choice and "click".

BRIEF DESCRIPTION OF THE DRAWING

Other objects, features and advantages of the invention will be readily apparent from the following description of a preferred embodiment thereof although variations and modifications may be effected without departing from the spirit and scope of the novel concepts of the disclosure, and in which.

DESCRIPTION OF THE PREFERRED EMBODIMENT

Figure 1:
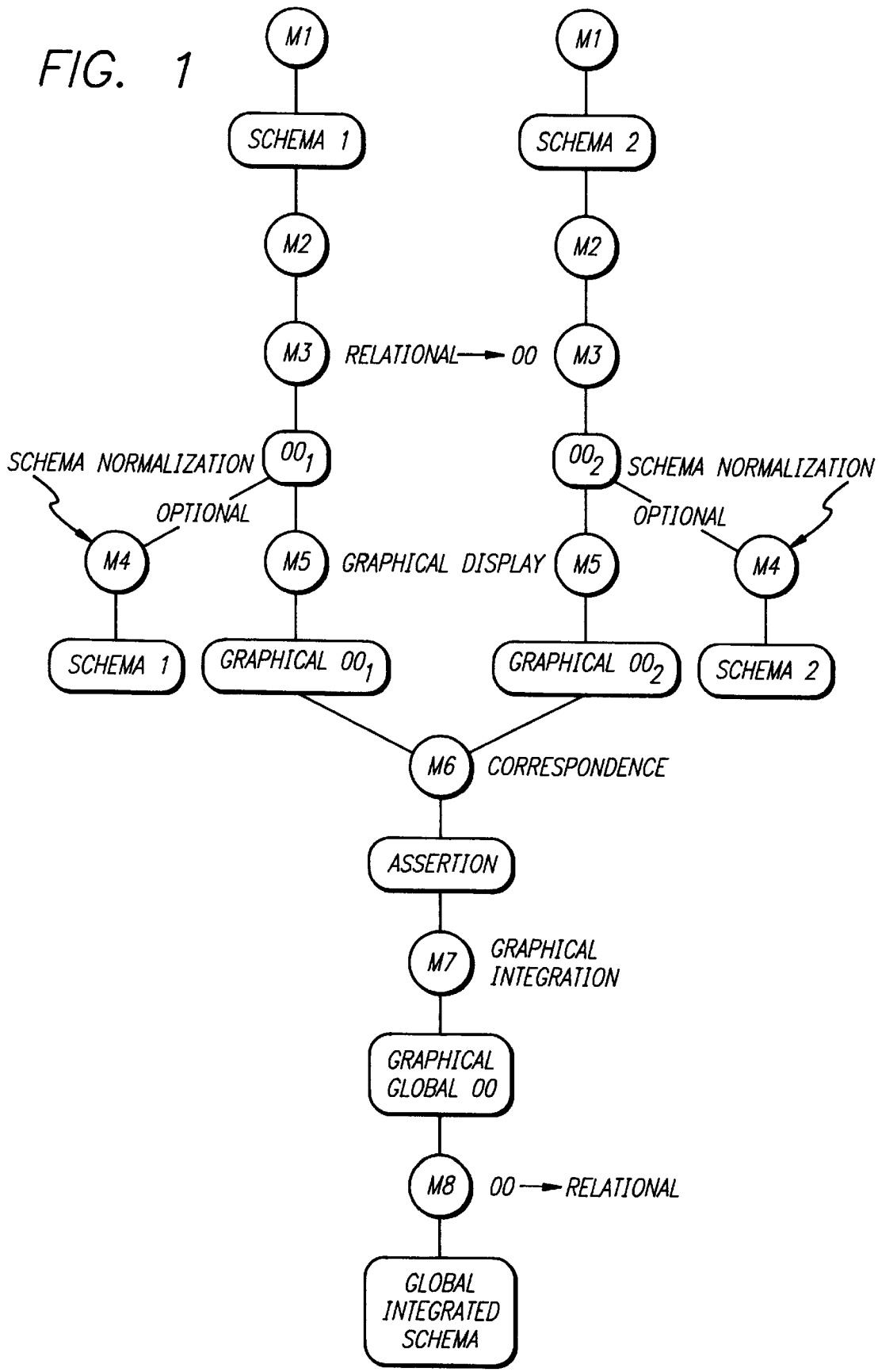
FIG. 1 is a data flow diagram of the components and software modules of the schema integration tool.

FIG. 1 illustrates the flow of information among the modules of the cross-referenced patent application for a method of integrating schemas. In FIG. 1 circles represent software modules of the integration tool and rectangles represent objects created by the method, or process.

Figure 2:
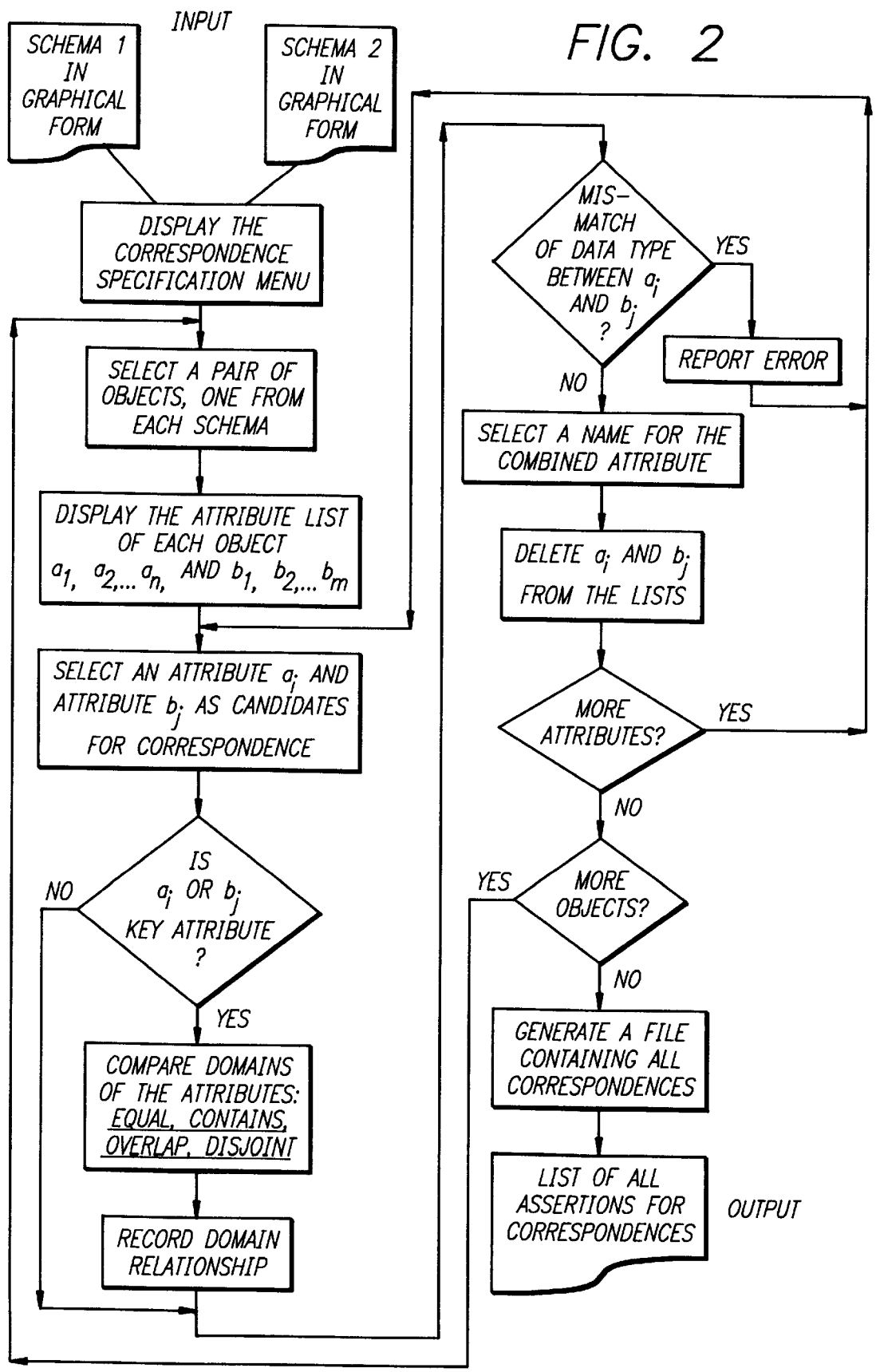
FIG. 2 is a flowchart representing the sequence of steps in the process of correspondence specification.
Figure 3:
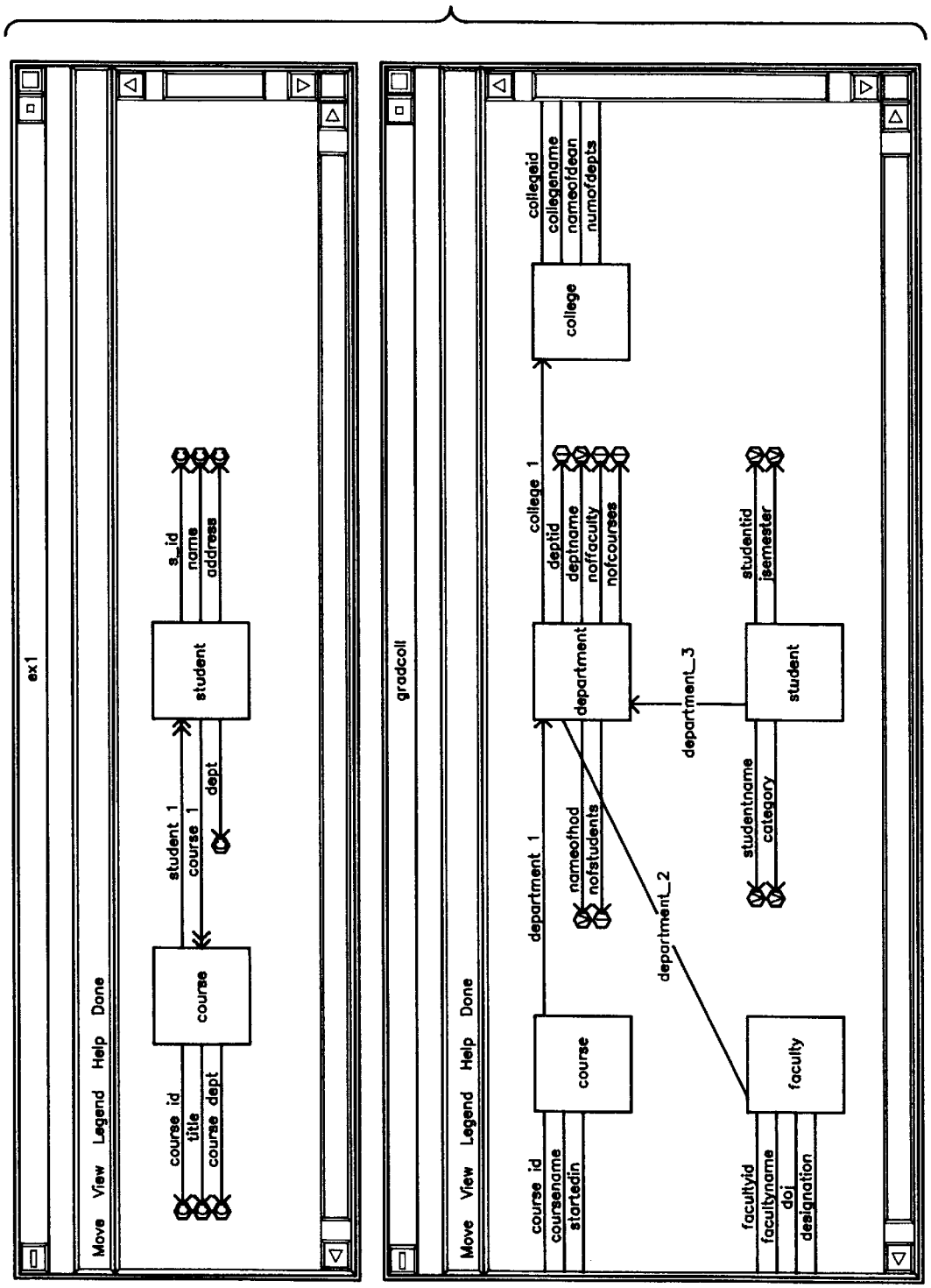
FIG. 3 illustrates two schemas in graphical form, the input to the software tool of this invention, as viewed on the monitor of a computer system.

FIG. 2 is a flowchart of the steps of this method, or program, as described below. The input is a graphical display of each of two object oriented schemas such as are produced by modules M5 illustrated in FIG. 1, the subject of the above cross-referenced patent application entitled "Method of Graphically Displaying an Object Oriented Schema". FIG. 3 is an example of such an input. The output of this module is a file that contains the correspondences specified by the user between different components of the two schemas as highlighted in FIG. 6.

Figure 4:
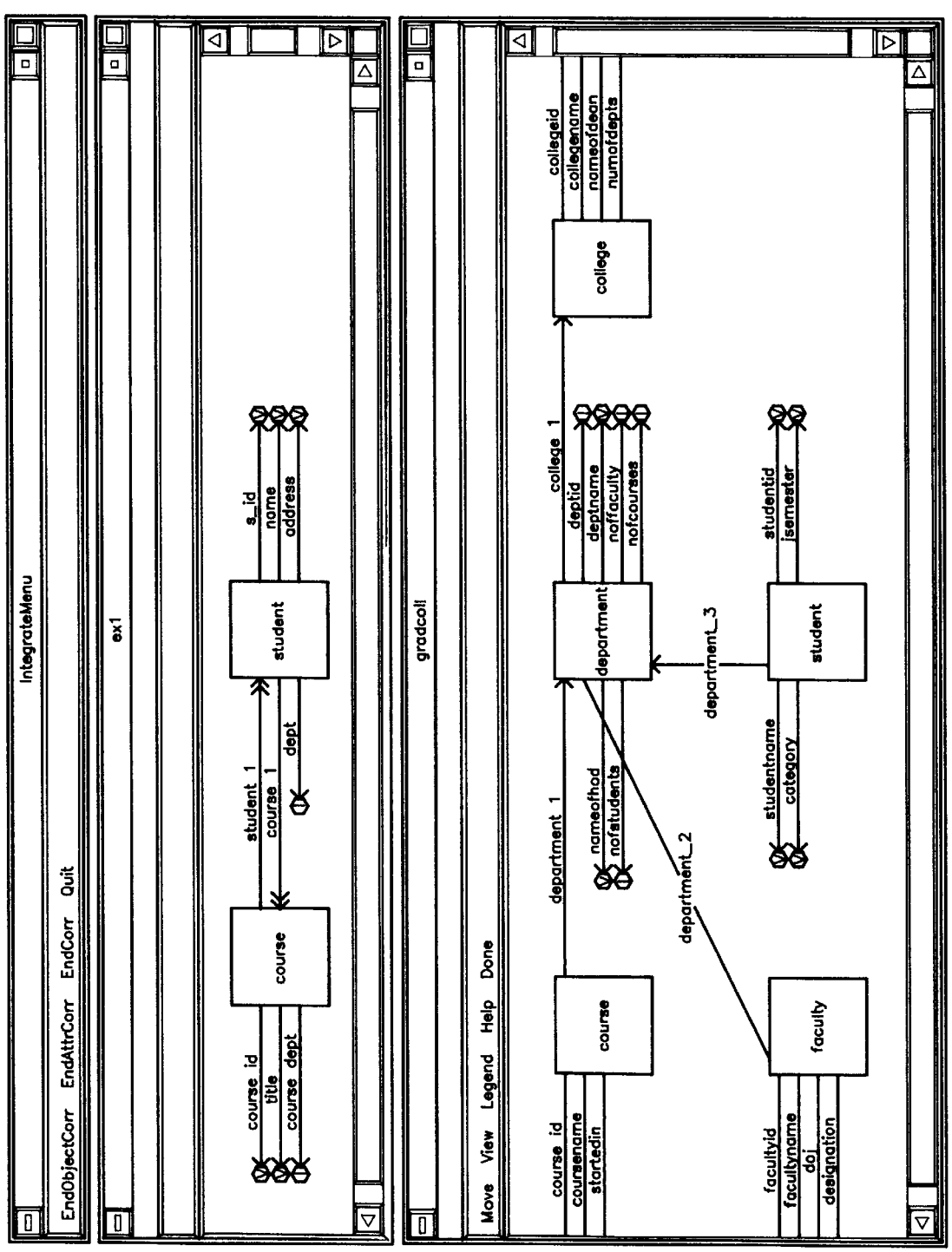
FIG. 4 illustrates the appearance of the monitor of the computer system with the correspondence specification menu displayed at the upper left hand corner of the screen of the monitor.
Figure 5:
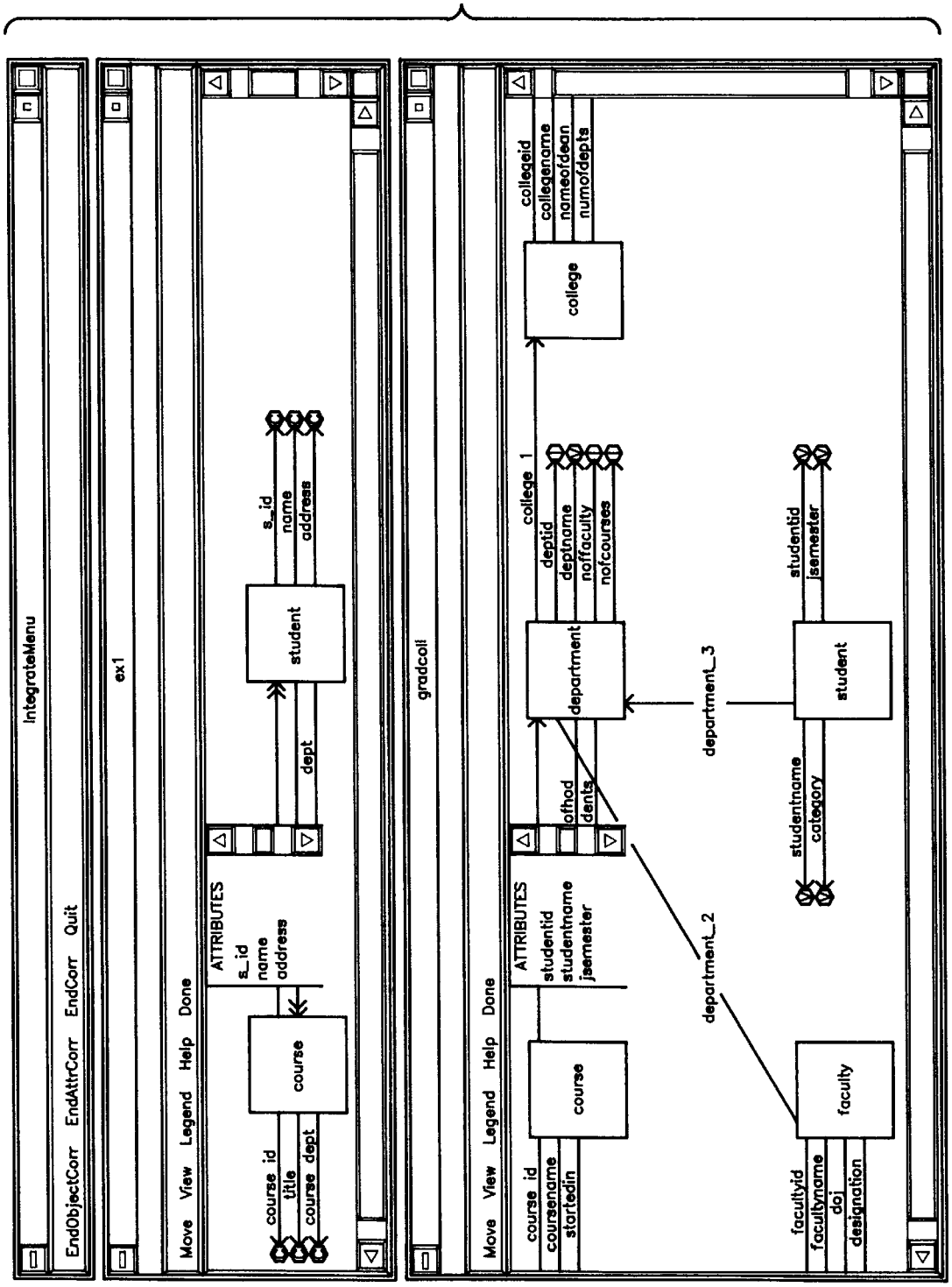
FIG. 5 illustrates the appearance of the monitor of the computer system displaying the attributes of two objects, one from each schema of the two schemas illustrated in FIG. 3.
Figure 6:
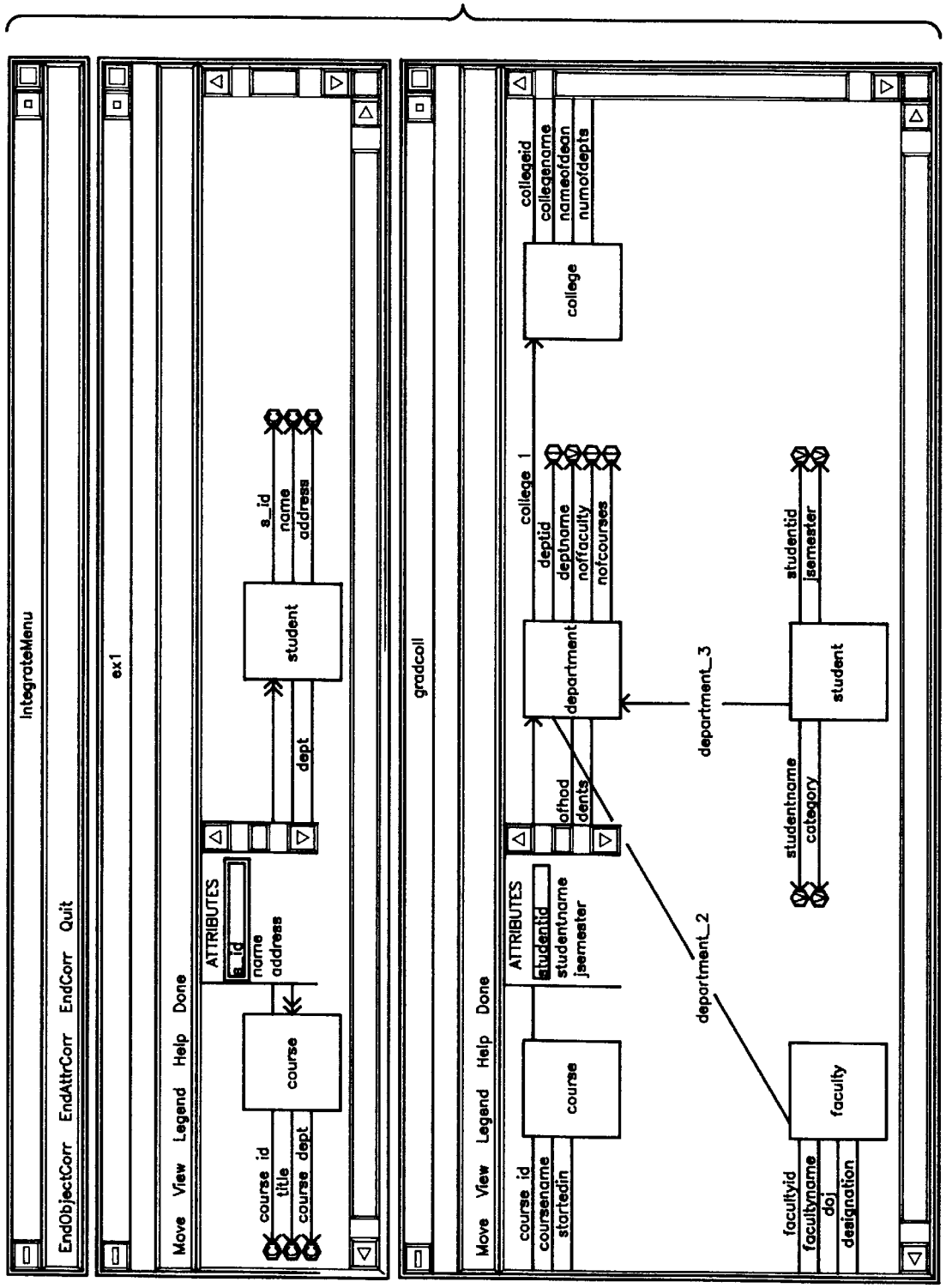
FIG. 6 illustrates the appearance of the monitor of the computer system displaying the result of clicking on one attribute of one object in one schema and an attribute of a corresponding object of the other schema.

Upon invocation, the program checks to ensure that the graphical displays of the two schemas to be integrated are on the screen. If not, an error message is displayed. If the graphical displays exist, then a correspondence specification menu is displayed as illustrated in FIG. 4. At this stage, the correspondences between object classes can be specified by selecting the object classes from the graphical display by clicking the appropriate object classes from both schemas. The completion of object class correspondence specification is notified by selecting "endObjectCorr" in the menu. The attributes from these selected object classes are then retrieved and displayed as lists as illustrated in FIG. 5. In FIG. 5, the lists of the attributes of the object classes "Student" from each of the two schemas are displayed. Correspondences between the attributes can be specified by selecting appropriate list elements. The attributes of the object classes that correspond to each other are selected. FIG. 6 illustrates the selection of the attribute "s_id" from the top schema to correspond with the attribute "student_id" of the bottom schema. The selections are then highlighted. Once this selection is complete, a check is performed to ensure that the two are of compatible data types. If not, the specified correspondence is invalidated, and an error message is displayed as the program continues to accept new correspondences.

If any of these two attributes is a primary key or a part of a primary key, then the domain information is captured. There are five types of domain correspondences among the attributes; they are Equal, Contains, Contained in, overlapping, and Disjoint. In the case of Equal, it means that for each instance of the attribute in one object class, there is also one and only one instance of that attribute in the other object class. In the case of Contains, the instances of the attributes in the first object class are a superset of the instances of the attributes in the second object class. In the case of Contained, the instances of the attributes in the first object class are a subset of the instances of the attributes in the second object class. In the case of overlapping, the instances of the attributes in the first object class overlap with the instances of the attributes in the second object class. In the case of Disjoint, the instances of the attributes in the first object class are disjoint from the instances of the attribute in the second object class.

The domain relationships captured here will be used during the integration phase. In case both attributes are non-primary keys, the information on the preference, i.e. which should be given more preference among these two attributes, is captured. Once attribute correspondences between the selected object classes is complete, the "endAttrCorr" option in the menu is selected. The user then continues to specify more correspondences among other object classes. This process continues until no more object class correspondences exist. The actual integration process begins when the "endCorr" option in the menu is selected. Upon selecting the this option, correspondences are saved into a file, and the two selected schemas are integrated based on the correspondences specified.

What is claimed is:

1. A method by which a computer system having a monitor provides a visual interface for specifying relationships and correspondences between two graphically displayed database schemas in object oriented (OO) form; comprising the steps of:

1, receiving as inputs two OO database schemas in graphical form, and displaying both schemas on the monitor of said computer system;

2, displaying on the monitor a correspondence specification menu;

3, selecting a pair of objects, one from each of the two schemas displayed in step 1, each of objects having attributes;

4, displaying on the monitor a list of all of the attributes of each of the objects selected in step 3;

5, selecting an attribute from each list of attributes displayed in step 4 as candidates for correspondence;

6, if either or both of the attributes selected in step 5 is a key attribute, comparing domains of the two selected attributes and recording the domain relationship;

7, if neither of the attributes selected in step 5 is a key attribute, and if there is a match between the data types of the two selected attributes at the completion of step 6, combining the two attributes to form a combined attribute and selecting a name for the combined attribute;

8, deleting the attributes selected in step 5 from the lists of attributes listed in step 4;

9, if there are more attributes in the lists of attributes listed in step 4, repeating steps 5 through 8 until all attributes listed in step 4 have been deleted;

10, if there are more objects with attributes, repeating steps 1 through 9 until there are no objects whose attributes have not been deleted;

11, generating a file containing all correspondences; and 12, identifying all assertions for correspondences between attributes.

2. The method of claim 1 in which if after completion of step 1 two schemas are not displayed, an error message is displayed.

3. The method of claim 2 in which, if in step 7 there is a mis-match between the types of data of the two selected attributes, an error report is displayed.

* * * * *